United States Patent [19]

Bompard

[11] 4,257,835
[45] Mar. 24, 1981

[54] METHOD OF MANUFACTURE OF MATERIAL REINFORCED WITH A THREE-DIMENSIONAL TEXTILE STRUCTURE

[75] Inventor: Bruno Bompard, Lyons, France

[73] Assignee: Commissariat a l'Energie Atomique, Paris, France

[21] Appl. No.: 62,020

[22] Filed: Jul. 30, 1979

[30] Foreign Application Priority Data

Aug. 8, 1978 [FR] France .................................. 78 23374

[51] Int. Cl.³ .......................... B32B 7/08; B32B 31/12; B32B 31/26
[52] U.S. Cl. ..................................... 156/92; 156/155; 156/252; 156/296; 264/29.1; 264/29.2; 264/29.5; 428/137; 428/218; 428/223; 428/238; 428/239; 428/367; 428/368; 428/902
[58] Field of Search .................. 112/403, 417; 156/92, 156/93, 148, 155, 252, 253, 296; 428/102, 137, 223, 238, 239, 902, 367, 368, 218; 264/29.1, 29.2, 29.5

[56] References Cited

U.S. PATENT DOCUMENTS

| | | | |
|---|---|---|---|
| 3,837,985 | 9/1974 | Chase | 156/92 X |
| 4,059,468 | 11/1977 | Bouillon | 156/93 |
| 4,201,611 | 5/1980 | Stover | 156/155 |

*Primary Examiner*—William A. Powell
*Assistant Examiner*—Robert A. Dawson
*Attorney, Agent, or Firm*—Kerkam, Stowell, Kondracki & Clarke

[57] ABSTRACT

The method consists in realizing densified layers of fibers, in forming a stack with said layers of fibers provided with holes and so arranged that the fibers of the layers extend within the stack in at least two directions designated as first and second directions which define the plane of the layers and that the holes form passages within the stack in a third direction, in implanting in said passages fibers which extend in the third direction, and in increasing the density of the assembly, for example by filling the gaps of the structure with a resin or a carbon matrix.

13 Claims, 3 Drawing Figures

METHOD OF MANUFACTURE OF MATERIAL REINFORCED WITH A THREE-DIMENSIONAL TEXTILE STRUCTURE

This invention relates to a method of manufacture of material which is reinforced with a three-dimensional textile structure.

It is recalled that a three-dimensional textile structure is constituted by threads, fibers, slivers and so forth which are oriented in the structure in three different directions usually at right angles to each other, thus endowing the textile structure with high mechanical strength, excellent heat-insulating capacity and good resistance to impacts and to abrasion, especially when the fibers constituting this structure are high-performance fibers such as carbon fibers, graphite fibers and so on.

In consequence, materials reinforced by a three-dimensional textile structure find many applications, especially in the production of parts having high resistance to delamination, to impacts and to heat, parts of this type being suitable for use as brake linings, for example.

Methods which are known at the present time for the manufacture of materials which are reinforced with a three-dimensional textile structure usually consist in preparing a three-dimensional textile structure, in then impregnating said structure with a material such as a thermosetting resin and finally in polymerizing the resin.

In these known methods, the three-dimensional textile structure is usually formed either from individual fibers by weaving methods or from stacked layers constituted by two-directional fabrics or by parallel fibers extending alternately from one layer to the next in a first direction and in a second direction by implanting the third direction in the stack of layers by means of a sewing method.

These known methods are attended by many disadvantages. In fact, the formation of the three-dimensional textile structure calls for complex, specific and costly equipment, especially weaving looms or sewing machines specially adapted to the formation of a structure of this type.

Moreover, these methods of manufacture of the three-dimensional textile structure can result only in articles of limited thickness in which a certain number of gaps are also present and prove undesirable at the time of subsequent impregnation and polymerization operations. By reason of the fact that the resin enters the structure by passing along the fibers, the presence of these gaps makes it difficult to effect impregnation to the center of the material. Said gaps also result in the production of inhomogeneous articles which consequently have lower characteristics, especially in regard to abrasion resistance.

The precise aim of the present invention is to provide a method for the preparation of material reinforced with a three-dimensional textile structure which overcomes the disadvantages mentioned in the foregoing.

This method essentially consists:

(a) in manufacturing layers of densified fibers,
(b) in forming a stack with said layers of fibers provided with holes and so arranged that the fibers of said layers extend within said stack in at least two directions referred-to as first and second directions which define the plane of the layers and that said holes form within said stack passages which extend in a third direction,
(c) in implanting in said passages fibers which extend in the third direction, and
(d) in increasing the density of the assembly thus obtained or in other words in filling the gaps of the structure, for example by introducing a resin or a carbon matrix into said structure.

The main advantage of the method defined in the foregoing is that it can readily be carried into effect since it does not call for any specific, complex and costly equipment in order to form the three-dimensional structure.

Moreover, by forming the three-dimensional structure in accordance with the method contemplated by the invention, that is, by implantation of fibers extending in the third direction in passages formed beforehand within a stack of densified fiber layers, the result thereby achieved is to limit the formation of gaps within the structure to the maximum extent. During the subsequent densification step, this permits satisfactory impregnation of the textile structure with suitable material and also results in a reinforced fabric having a practically equal and constant density of fibrous material in all the zones of the fabric.

Finally, the method in accordance with the invention makes it possible to carry out the densification step mentioned above without any attendant danger of modification of the orientation and distribution of fibers constituting the three-dimensional textile structure.

In a first embodiment of the method according to the invention, said stack is formed by means of layers of densified fibers by placing said layers one above the other and then by perforating the layers which have thus been stacked so as to form in said stack the passages which extend in the third direction.

In a second embodiment of the method according to the invention, said stack is formed from densified layers of fibers by perforating said layers beforehand, the layers which have thus been perforated being then placed one above the other in such a manner as to ensure that the perforation of the successive layers form within said stack the passageways which extend in the third direction.

The densified layers of fibers can be constituted either by a densified two-directional fabric, or by densified parallel fibers. The stack can also be realized by placing densified layers of fibers constituted by a densified two-directional fabric and densified layers of fibers constituted by densified parallel fibers one above the other.

In these different embodiments of the method according to the invention, said layers of densified fibers are advantageously obtained by impregnating layers of parallel fibers of layers formed by a two-directional fabric by means of a polymerizable resin such as an epoxy resin, a polyester resin or a phenolic resin or by means of a pyrolysable resin such as polyvinyl acetate and by polymerizing or subsequently pyrolyzing said resin to a partial extent.

Preferably and according to the method contemplated by the invention, the fibers which extend in the third direction are implanted in the passages in the form of rods constituted by an assembly of densified parallel fibers held together by means of a prepolymerized resin, the rods being calibrated to the dimensions of the passages which extend in the third direction.

According to the invention, the fibers employed can consist of natural or synthetic fibers in the form of either continuous or non-continuous filaments which may be twisted if necessary.

Among the fibers which can suitably be employed by way of example, mention can be made of carbon fibers, graphite fibers, glass fibers, silica fibers and aromatic fibers such as Kevlar fibers.

It is also pointed out that the method according to the invention can be carried into effect by employing fibers of a different type in order to form the three-dimensional structure constituted by the stack of fiber layers and by the fibers which are implanted in the third direction. It is thus possible to obtain composite materials by combining different fibers with each other.

Further distinctive features and advantages of the invention will become apparent from the following description which is clearly given by way of illustration and not in any limiting sense, reference being made to the accompanying drawings, wherein.

Figure 1:
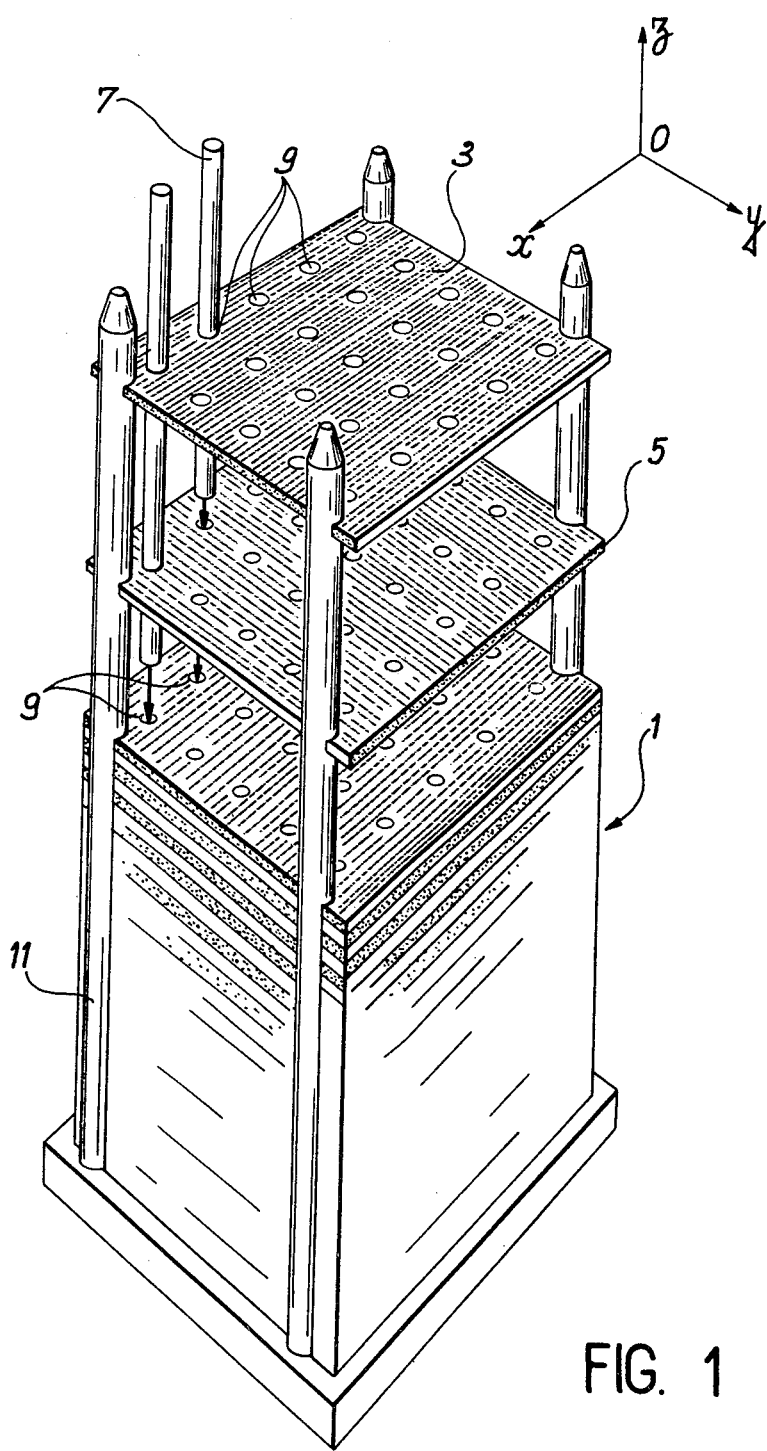
FIG. 1 is a schematic illustration of the different steps involved in the manufacture of a material according to the invention.

Referring to FIG. 1 which illustrates diagrammatically the different steps involved in the method according to the invention, it is apparent that the three-dimensional reinforcement textile structure is obtained on the one hand from a stack 1 of layers of densified fibers such as the layers 3 and 5 so arranged that the fibers of the layers extend within the stack in two directions OX and OY and, on the other hand, from fibers 7 which extend in the third direction OZ.

The layers 3 and 5 are each constituted by fibers arranged in parallel relation, the fibers of the layer 3 being oriented in the direction OX and the fibers of the layer 5 being oriented in the direction OY. Said fibers have been densified beforehand by impregnating the layers with a polymerizable resin and by subsequently polymerizing the resin to a partial extent.

As can readily be understood, the fiber layers such as the layers 3 and 5 could be constituted by a two-directional warp and weft fabric in which the fibers extend in the directions OX and OY.

The layers such as 3 and 5 are provided with holes 9 which have been formed in said layers by conventional techniques such as punching, for example, and the holes 9 of the successive layers are placed in register so as to define within the stack of layers 1 passages which extend in the direction OZ.

Although the directions OX, OY and OZ are orthogonal in this figure, it is readily apparent that these directions can be different and that, in particular, the holes 9 of the successive layers can define passages which extend obliquely within the stack.

In the method according to the invention, the stack of layers 1 is formed by placing layers of densified fibers such as the layers 3 and 5 one above the other in alternate sequence and in holding the layers together by means of an assembly frame 11 in order to ensure that the holes 9 are placed accurately in register and define continuous passages which extent in the direction OZ.

There are then introduced into the passages 9 the fibers 7 which have preferably been assembled beforehand in the form of rods previously calibrated to the diameter of the holes in order to ensure that the available space within the passages 9 is completely filled.

Said rods can be constituted for example by an assembly of parallel, densified fibers which are held together by means of a prepolymerized resin.

After the fibers 7 have been introduced into the stack, the assembly thus obtained is compacted in a press. Densification of the compacted assembly is then carried out by conventional techniques such as impregnation with polymerizable resins among which epoxy resins, phenolic resins or polyester resins can be mentioned by way of example, this impregnation treatment being followed by polymerization of the resin, or deposition of pyrolytic carbon by means of a flow of gaseous hydrocarbon such as methane or propane or, alternatively, impregnation with a pyrolyzable resin followed by a heat treatment involving pyrolysis of the resin.

Figure 2:
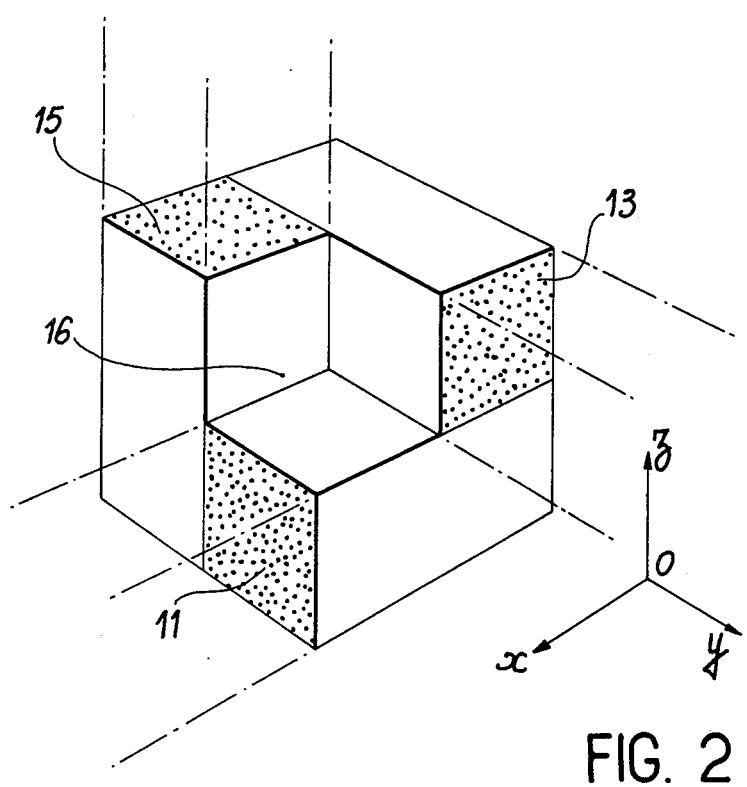
FIG. 2 is a schematic illustration of the elementary structure of a three-dimensional textile structure obtained by means of the methods of the prior art.
Figure 3:
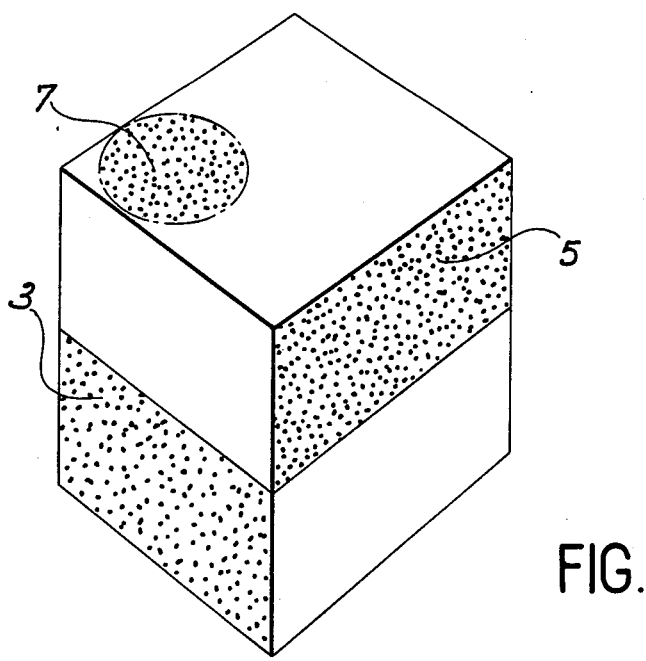
FIG. 3 is a schematic representation of the elementary structure of the material obtained by means of the method according to the invention.

Referring to FIGS. 2 and 3 which illustrate respectively an elementary mesh of a three-dimensional structure obtained by means of the weaving methods of the prior art and an elementary mesh of the material obtained by means of the method according to the invention, it is apparent that in the case of FIG. 2, the crossing of three series of fibers 11, 13 and 15 oriented respectively in the directions OX, OY and OZ results in the formation of two diametrically opposite unoccupied spaces 16 which represent at least 25% of the total theoretical volume occupied by the fibers in this elementary mesh. In contrast, FIG. 3 shows that the crossing of the three series of fibers 3, 5 and 7 oriented respectively in the directions OX, OY and OZ does not result in the formation of unoccupied spaces or gaps in the elementary mesh.

It is thus apparent that the method according to the invention makes it possible to obtain materials in which a maximum fiber filling coefficient is achieved whereas the presence of unoccupied spaces such as 16 in the three-dimensional structure obtained by means of methods of the prior art results only in non-homogeneous articles having lower characteristics in zones which are not occupied by fibers.

One example of construction of material reinforced with a three-dimensional structure of carbon fiber is given hereinafter.

A carbon fabric is woven from a carbon thread containing three thousand filaments 7 microns in diameter and having a linear mass of 1960 decitex. The carbon fabric is made of 7.5 threads/cm in warp and weft, a satin weave being adopted and the density of the carbon being 1.74.

The fabric thus formed is impregnated with a phenolic resin so that the volume percentage of resin is 30%. The pre-impregnated fabric is then cut in the form of plates measuring 44×44 cm, said plates being then placed on a heating press in order to polymerize the resin and reduce the volume percentage of this latter to 20%, the excess resin being removed naturally and simply by creepage flow around the periphery of the plate. Densified plates having a thickness of 3/10 mm are thus obtained.

After this polymerization treatment, the plates obtained are cut into 22×22 cm plates while carefully maintaining the alignment of the warp threads and weft threads during the cutting operation. Each 22×22 cm plate is then placed in a punching machine equipped with one hundred punches each having a diameter of 1 mm, said punches being spaced linearly at equal intervals of 1 mm. A row of holes is formed in each plate and the operation is repeated one hundred times on the same plate after displacement of the punching machine in translational motion so as to obtain plates measuring 22×22 cm and provided with ten thousand uniformly spaced holes.

The plates thus obtained have the following characteristics:
weight of fibers per m² prior to punching: 295 g/m²;
weight of fibers per m² after punching: 237 g/m².

When 650 plates measuring 22×22 cm have thus been punched, they are stacked within the assembly frame illustrated in FIG. 1 in order to obtain a block having dimensions of 22×22×26 cm in height.

Densified ground rods are inserted in the passages formed by the perfectly aligned holes of the plates and are formed from carbon sliver pre-impregnated with partially polymerized resin. Said rods have a diameter of 0.95 mm and a yarn count of 12,000 decitex.

After insertion of said ground rods, the assembly is compacted by means of clamping plates in order to reduce the thickness of the block to 20 cm. Densification is then carried out by impregnating the block with a phenolic resin and then subjecting it to a carbonization treatment.

The block thus obtained has the following characteristics prior to the densification treatment:
density of material (fibers alone): 1.09
density of carbon: 1.74
percentage of fiber: 63%
distribution of fibers in the direction OX: 38.5%
distribution of fibers in the direction OY: 38.5%
distribution of fibers in the direction OZ: 23%
pitch: 0.3×2×2.

It is thus observed that a highly attractive and distinctive feature of the material finally obtained lies in the extremely fine pitch existing between the threads of the directions OX and OY. This fineness of pitch proves highly advantageous since it is thus possible to obtain a material having finely distributed porosity.

Although layers of fibers constituted by a two-directional fabric have been employed in this example, it is readily apparent that said layers can be replaced by layers of parallel fibers having a thickness of 100 microns, for example, or else by textile layers in the form of thick fabrics, of triaxial fabric or of felt, for example. Furthermore, the stack can be formed by placing layers of fibers constituted by a two-directional fabric and layers of parallel fibers one above the other.

Moreover, when layers of parallel fibers are employed, said layers can be placed in the stack in such a manner, for example, as to modify the orientation of five successive layers and to ensure that the fibers are oriented respectively in said layers in the direction OX, then at angles of 30°, 45°, 60° with respect to the axis OX and finally along the axis OY, thus permitting an even greater improvement in the fineness of pitch obtained.

It is thus apparent that the method according to the invention offers a very high degree of flexibility and can be adapted to the fabrication of a number of different materials, particularly as it is also possible to vary the nature of fibers employed in the layers constituting the stack and in the rods implanted in the third direction and thus to combine different fibers in a suitable manner.

Finally, the method according to the invention makes it possible to manufacture parts having the desired shapes either in a direct process, for example, which consists in winding the punched layers of fibers on a mandrel of suitable shape before implanting the fibers which extend in the third direction or in an indirect process which consists in subsequent conversion by machining of a part obtained by practical application of said method.

We claim:

1. A method of manufacture of material reinforced with a three-dimensional textile structure, wherein said method consists:
    (a) in realizing densified layers of fibers,
    (b) in forming a stack of layers from said fibers provided with holes and so arranged that the fibers of said layers extend within said stack in at least two directions designated as first and second directions which define the plane of the layers and that said holes form within said stack passages which extend in a third direction, each passage having a given dimension,
    (c) in implanting in said passages rods constituted by an assembly of densified fibers, said rods extending in the third direction,
    (d) in increasing the density of the assembly thus obtained.

2. A method according to claim 1, wherein said stack is formed by means of layers of densified fibers by placing said layers one above the other and then by perforating the layers which have thus been stacked so as to form in said stack the passages which extend in the third direction.

3. A method according to claim 1, wherein said stack is formed by means of densified layers of fibers by perforating said layers beforehand, the layers which have thus been perforated being then placed one above the other in such a manner as to ensure that the perforations of the successive layers form within said stack the passages which extend in the third direction.

4. A method according to claim 1, wherein said densified layers of fibers are constituted by a two-directional fabric.

5. A method according to claim 1, wherein the densified layers of fibers are constituted by densified parallel fibers.

6. A method according to claim 1, wherein the stack is realized by placing densified layers of fibers constituted by a densified two-directional fabric and densified layers of fibers constituted by densified parallel fibers one above the other.

7. A method according to claim 1, wherein said densified layers of fibers are obtained by impregnating layers of fibers with a polymerizable or pyrolyzable resin and by subsequently polymerizing or pyrolyzing said resin to a partial extent.

8. A method according to claim 1, wherein each rod is constituted by an assembly of densified parallel fibers held together by means of a prepolymerized resin.

9. A method according to claim 1, wherein the assembly thus obtained is densified by impregnation with a polymerizable or pyrolyzable resin and by then polymerizing or pyrolyzing said resin.

10. A method according to claim 1, wherein the assembly thus obtained is densified by depositing pyrolytic carbon from a flow of gaseous hydrocarbon.

11. A method according to claim 1, wherein said fibers are selected from the group comprising carbon fibers, graphite fibers, glass fibers, silica fibers and aromatic fibers.

12. A method according to claim 7, wherein said resin is selected from the group comprising the phenolic resins, the epoxy resins, the polyester resins and polyvinyl acetate.

13. A method of manufacture of material reinforced with a three-dimension textile structure, wherein said method consists:
- (a) in realizing densified layers of fibers by one of the means consisting of impregnating said layers of fibers with a polymerizable resin and then polymerizing said resin to a partial extent, and impregnating said layers of fibers with a pyrolyzable resin and then pyrolyzing said resin to a partial extent,
- (b) in forming calibrated rods constituted by an assembly of densified parallel fibers held together by means of a prepolymerized resin,
- (c) in forming a stack with said layers of fibers, said layers being provided with holes and so arranged that the fibers of said layers extend within said stack in at least two directions designated as first and second directions, which define the plane of the layers and that said holes form within said stack passages which extend in a third direction, each passage having a given diameter,
- (d) in implanting said rods in said passages, said rods being calibrated to the diameter of the passages, whereby the latters are completely filled by the rods, to define a three-dimensional assembly, and
- (e) densifying this assembly by one of the means consisting of impregnating the assembly with a polymerizable resin and then polymerizing said resin, impregnating the assembly with a pyrolyzable resin and then pyrolyzing said resin, and depositing pyrolytic carbon from a flow of gaseous hydrocarbon.

* * * * *